United States Patent [19]

Mizokami

[11] 4,429,971
[45] Feb. 7, 1984

[54] APPARATUS FOR TESTING AUTOMATIC ELECTRONIC FLASH

[75] Inventor: Kazunori Mizokami, Hachioji, Japan

[73] Assignee: Olympus Optical Company Ltd., Tokyo, Japan

[21] Appl. No.: 455,300

[22] Filed: Jan. 3, 1983

Related U.S. Application Data

[63] Continuation of Ser. No. 235,702, Feb. 18, 1981, abandoned.

[30] Foreign Application Priority Data

Apr. 23, 1980 [JP] Japan .................................. 55-54785

[51] Int. Cl.³ ............................................ G03B 15/05
[52] U.S. Cl. .................................. 354/415; 354/127.11
[58] Field of Search ...................... 354/32, 33, 34, 35, 354/60 F, 127, 128, 139, 145, 149

[56] References Cited

U.S. PATENT DOCUMENTS

4,016,575  4/1977  Uchiyama et al. ............. 354/139 X

FOREIGN PATENT DOCUMENTS

55-40413  3/1980  Japan .

*Primary Examiner*—Michael L. Gellner
*Attorney, Agent, or Firm*—Weinstein & Sutton

[57] ABSTRACT

An apparatus for testing an automatic electronic flash is used with the combination of a single lens reflex camera of TTL direct photometry type and a TTL automatic electronic flash. The apparatus includes a test switch which is connected in parallel with a synchro contact contained in the camera for initiating the emission of flashlight and which is closed to test the emission of flashlight from a flash discharge tube. In this manner, by closing the test switch, the emission of flashlight from the electronic flash can be tested and the amount of illumination controlled by an exposure control circuit contained in the camera, without operating a shutter.

12 Claims, 6 Drawing Figures

F I G. 1
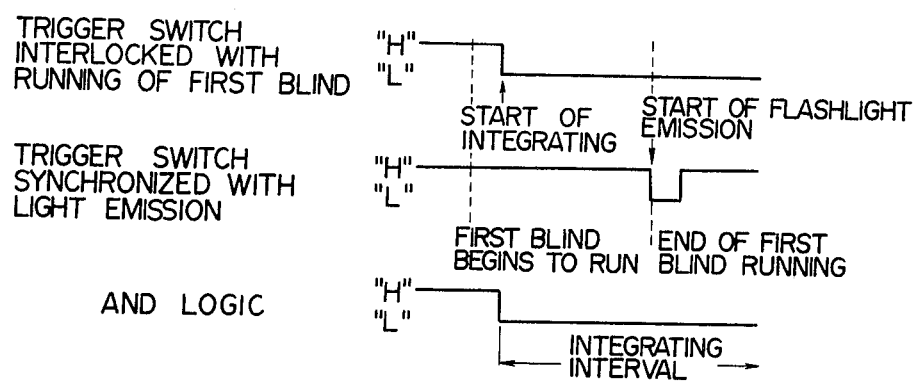
F I G. 2
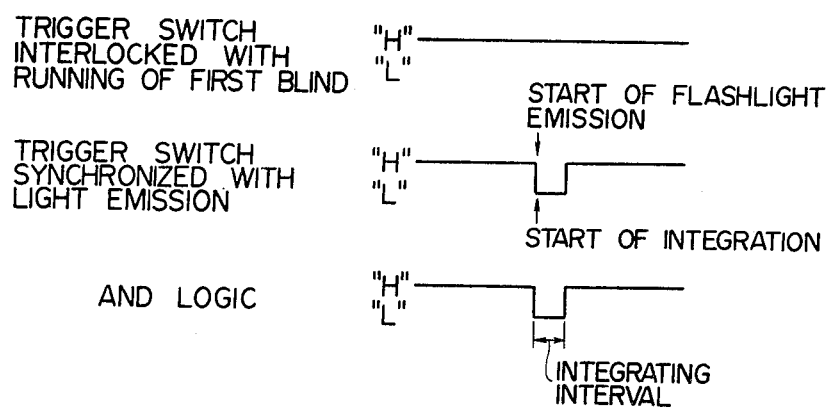

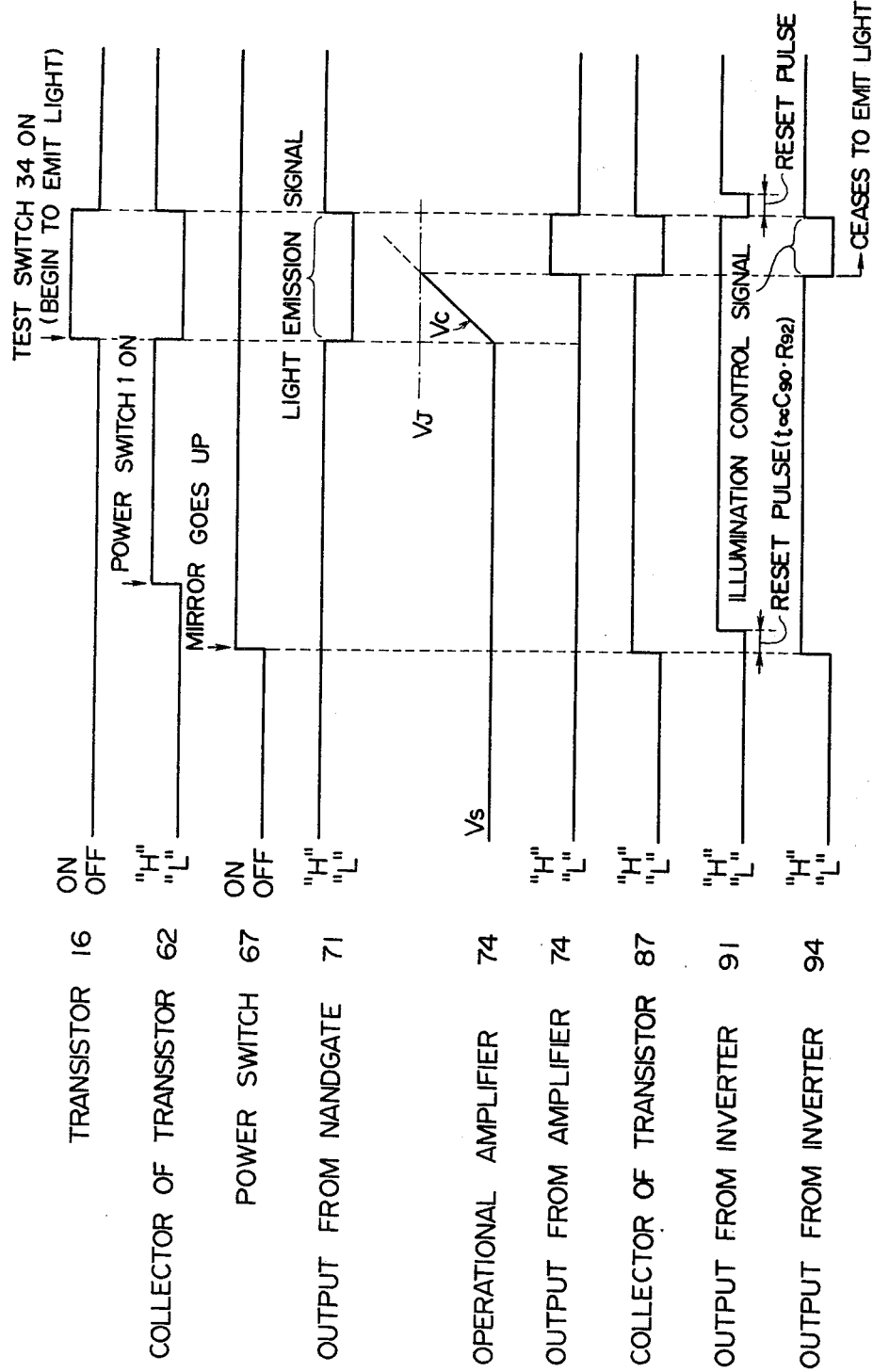

APPARATUS FOR TESTING AUTOMATIC ELECTRONIC FLASH

This is a continuation of application Ser. No. 235,702, filed Feb. 18, 1981, now abandoned.

BACKGROUND OF THE INVENTION

The invention relates to an apparatus for testing an automatic electronic flash, and more particularly, to such testing apparatus which is used for a combination of a single lens reflex camera of the TTL direct photometry type and a TTL automatic electronic flash.

As is recognized, a single lens reflex camera of the TTL direct photometry type is adapted to receive reflected light from an object being photographed which passes through a taking lens. The reflected light is then reflected by a shutter blind surface and a film surface so as to impinge on a photometric element contained in an exposure control circuit for purpose of exposure control. A TTL automatic electronic flash is adapted to cooperate with such single lens reflex camera, and includes an illumination control circuit which is activated by an output from the exposure control circuit within the camera whenever the flash is combined with the camera, thus allowing the light emission from a flash discharge tube to be controlled.

In such a flash-and-camera combination, the light emission from the electronic flash occurs in interlocked relationship with a shutter release operation. Specifically, as a first shutter blind begins to run, an integrating circuit which forms part of the exposure control circuit is activated to derive an integrated output. The flash discharge tube begins to emit light at the termination of the running of the first shutter blind, and when the integrated output reaches an optimum value, the illumination control circuit is activated to interrupt the light emission from the tube (see FIG. 1).

At times, it is desired to test the automatic electronic flash to determine whether it operates properly. With the conventional combination, the light emission circuit and the illumination control circuit of the electronic flash cannot be activated unless the shutter of the camera is actually operated. Consequently, it follows that the shutter must be operated to permit an exposure of the film disadvantageously when it is desired to test the electronic flash.

SUMMARY OF THE INVENTION

In view of the foregoing, it is an object of the invention to provide an apparatus for testing an automatic electronic flash which includes a test switch connected in shunt with a usual synchro contact so that whenever the test switch is operated, the light emission from the electronic flash is permitted to activate the exposure control circuit of the camera to provide an illumination control signal even if the shutter of the camera is not operated.

In accordance with the invention, the closure of the test switch permits a light emission from the flash discharge tube and enables an integrating function of a photometric circuit contained within the camera, thereby allowing an illumination control signal to be produced. Hence, the functioning of a TTL automatic electronic flash which operates to control the illumination on the basis of the amount of light received by the camera can be tested without requiring a shutter operation, thus avoiding an unintended film exposure during the test.

Also in accordance with the invention, the exposure control circuit is rendered operative during both the test and the normal flash photography, and the integrating operation by the photometric circuit takes place with their independent timing.

BRIEF DESCRIPTION OF THE DRAWINGS

FIGS. 1 and 2 graphically illustrate the timing of a usual flash photographing operation and a test operation according to the invention;

FIG. 6 is a series of timing diagrams which illustrate the operation of the testing apparatus.

DESCRIPTION OF PREFERRED EMBODIMENT

Figure 3:
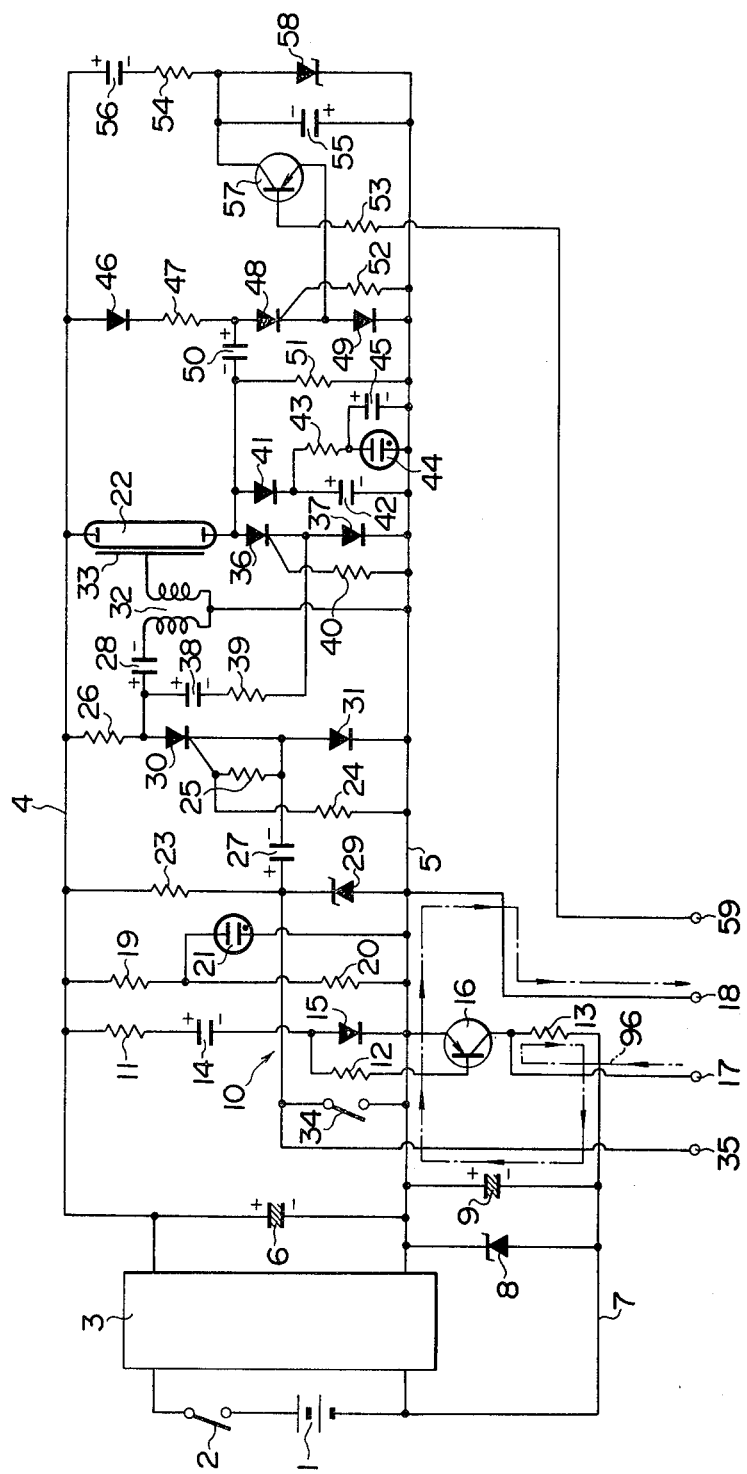
FIG. 3 is a circuit diagram of an electronic flash including a test apparatus according to one embodiment of the invention.

It should be understood that the test operation with the testing apparatus of the invention is premised on the assumption that the single lens reflex camera of the TTL direct photometry type satisfies the following three prerequisite conditions (a) to (c):

(a) The photometry is designed to determine the amount of reflected light from a first shutter blind surface (during a film winding operation) or from a second shutter blind surface (before a film winding operation). It is assumed that each of the first and the second shutter blinds is finished to exhibit a reflectivity which is comparable to that of a standard film or that there is provided a correction circuit which permits the photometry to be performed by treating the reflectivity of the first and the second shutter blinds as being of a value which is equivalent to the reflectivity of a standard film.

(b) It is assumed that a movable mirror is in its up position.

(c) An actual diaphragm setting AE is possible while a preview button is depressed.

On the basis of the described conditions, an arrangement is made in accordance with the invention such that in response to an operation of a test switch, a light emission from a flash discharge tube is initiated and a trigger switch associated with a photometric, integrating circuit contained within the camera is operated in synchronism with a light emission signal which is produced as soon as the light emission occurs, thus allowing an exposure control circuit to operate independently of a shutter operation.

In a combination of a single lens reflex camera of the TTL direct photometry type and a TTL automatic electronic flash in which the testing apparatus of the invention is incorporated, a trigger switch which is interlocked with the running of a first shutter blind and another trigger switch which is synchronized with the initiation of a light emission signal produce outputs which occur as shown in FIG. 1 during a normal flash photography and as shown in FIG. 2 during a test operation. Specifically, during a normal flash photography, the trigger switch which is interlocked with the running of a first shutter blind is operated as the first shutter blind begins to run, activating a photometric circuit to initiate an integrating operation. The emission of flashlight occurs at the termination of running of the first blind. By contrast, during a test operation, the trigger switch which is interlocked with the running of the first shutter blind remains inoperative while the trigger switch which is synchronized with the light emission signal is operated to initiate an integrating operation by the photometric circuit.

In order to assure that the normal flash photography and the test operation are compatible, a logical product of both the outputs is taken so that independent integrating intervals are obtained. It is to are noted that the integrating interval during the test operation (shown in FIG. 2) is chosen to be longer than the period required for the full emission of light from the automatic electronic flash.

FIG. 3 is a circuit diagram of an electronic flash incorporating a testing apparatus according to one embodiment of the invention. As shown, a power source in the form of a battery 1 is connected through a power switch 2 to a voltage booster 3 which is formed by a DC—DC converter. A pair of supply buses 4, 5 are connected with output terminals of the booster 3. A main capacitor 6 is connected across the buses 4, 5 so as to be maintained charged. Another bus 7 is connected to the negative terminal of the battery 1, and a parallel combination of a Zener diode 8 and a capacitor 9 is connected across the buses 5, 7.

The testing apparatus of the invention includes a detector 10 which is formed by resistors 11 to 13, capacitor 14, diode 15 and PNP transistor 16. The purpose of the detector is to detect a light emission signal. Specifically, a series combination of resistor 11, capacitor 14 and diode 15 is connected across the buses 4, 5 while a series combination of transistor 16 and resistor 13 is connected across the buses 5, 7, with resistor 12 connected between the junction between the capacitor 14 and the diode 15 and the base of the transistor 16. The junction between the transistor 16 and resistor 13 or the collector of the transistor 16 is connected to a signal transmitting terminal 17 which is adapted to mate with a corresponding terminal on a camera of the TTL direct photometry type (hereafter simply referred to as "camera"), and when the flash discharge tube emits light to render the transistor 16 conductive, a light emission signal is transmitted to the camera through the terminal 17 and another signal transmitting terminal 18 which is connected to a synchro contact.

A series combination of resistors 19, 20 is connected across the buses 4, 5 and a neon tube 21 is connected between the junction between these resistors 19, 20 and the bus 5 for illumination upon completion of charging of the main capacitor 6.

A flash discharge tube is shown at 22 and is associated with a trigger circuit which includes resistors 23 to 26, capacitors 27, 28, Zener diode 29, thyristor 30, diode 31 and a trigger transformer 32. Specifically, a series circuit including resistors 23 and Zener diode 29 is connected across the buses 4, 5 as is a series combination of resistor 26, thyristor 30 and diode 31. Capacitor 27 is connected across the junction between the resistor 23 and Zener diode 29 and the junction between the thyristor 30 and diode 31. Resistor 24 is connected between the gate of the thyristor 30 and the bus 5 while resistor 25 is connected between the gate and the cathode of the thyristor 30. The trigger transformer 32 has one end of both its primary and secondary coils connected in common to the bus 5 while the other end of the primary coil is connected through capacitor 28 to the junction between the resistor 26 and thyristor 30 and the other end of the secondary coil is connected to the trigger electrode 33 of the flash discharge tube 22.

To operate the trigger circuit, in accordance with the invention, a test switch 34 is connected in parallel with the Zener diode 29, across which signal transmitting terminals 35, 18 are connected with the synchro contact on the part of the camera. The test switch 34 may comprise a normally open pushbutton switch.

In operation, the synchro contact is initially closed on the part of the camera in interlocked relationship with a photographing operation to thereby short-circuit the terminals 35, 18 or the test switch 34 is closed, thus allowing the capacitor 27 which has been charged to the polarity shown to discharge through a path including terminals 35, 18 (or test switch 34), resistor 24, and the gate-cathode path of the thyristor 30 and returning to the capacitor 27. This triggers the thyristor 30 into conduction. Then, the capacitor 28 which has been charged to the polarity shown discharges through a path including the conducting thyristor 30, diode 31, the primary coil of the trigger transformer 32 and returning to the capacitor 28, thus inducing a high tension trigger pulse across the secondary coil of the transformer 32 for application to the trigger electrode 33 of the flash discharge 22.

It is to be understood that the flashlight illumination from the flash discharge tube 22 is controlled in a series control mode, and at this end, a series combination of thyristor 36 and diode 37 is connected in series with the tube 22 across the buses 4, 5. A series combination of capacitor 38 and resistor 39 is connected between the junction between the resistor 26 and thyristor 30 and the junction between the thyristor 36 and diode 37. A resistor 40 is connected between the gate of the thyristor 36 and the bus 5, thus forming a triggering circuit associated with thyristor 36.

The triggering circuit associated with the thyristor 36 is rendered operative when the trigger circuit mentioned above operates. Specifically, when the thyristor 30 conducts, the capacitor 38 which has been charged to the polarity shown discharges through a path including the thyristor 30, diode 31, resistor 40, the gate to cathode path of the thyristor 36, resistor 39 and returning to the capacitor 38. In this manner, the thyristor 36 is triggered into conduction. It will be seen that the flash discharge tube 22 begins the emission of light in response to the application of a trigger pulse to the trigger electrode 33 thereof and to the conduction of the thyristor 36 in the series control circuit thereof.

Series combination of diode 41 and capacitor 42 is connected between the anode of the thyristor 36 and the bus 5, and the capacitor 42 is shunted by a series combination of resistor 43 and neon tube 44, the latter being shunted by a parallel capacitor 45. In this manner, an illumination complete indicator circuit is formed.

The illumination completion indicator circuit is rendered operative by an illumination control circuit and a commutation circuit, to be described later, whenever the thyristor 36 is rendered non-conductive. Specifically, when the thyristor 36 becomes non-conductive, its anode potential rises to divert the discharge current through the tube 22 to a path including the diode 41 and capacitor 42, thus charging the capacitor 42. When the capacitor 42 is completely charged, the discharge tube 22 ceases its emission of light. Subsequently, the capacitor 42 discharges through a path including resistor 43 and neon tube 44 as well as its parallel connected capacitor 45 of a reduced capacitance. The neon tube 44 becomes illuminated by the discharge of the capacitor 45 and becomes extinguished when the capacitor 45 has fully discharged. Consequently, neon tube 44 continues its flashing operation until the capacitor 42 is completely discharged.

A commutation circuit which renders the thyristor 36 non-conductive comprises a series circuit connected across the buses 4, 5 and including diode 46, resistor 47, thyristor 48 and diode 49; a commutating capacitor 50 connected between the anode of the thyristor 36 and the anode of the thyristor 48; and a resistor 51 connected between the anode of the thyristor 36 and the bus 5. The capacitor 50 in the commutation circuit is previously charged to the polarity shown, and the voltage thereacross is applied to the series combination of the thyristor 36 and diode 37 in a reverse direction whenever the thyristor 48 is rendered conductive by an llumination control circuit to be described later. In this manner, the thyristor 36 is rendered non-conductive.

Illumination control circuit includes resistors 52 to 54, capacitors 55, 56, PNP transistor 57 and Zener diode 58. Specifically, a series circuit including capacitor 56, resistor 54 and Zener diode 58 is connected across buses 4, 5, and the Zener diode 58 is shunted by capacitor 55. Transistor 57 has its collector connected to the anode of the Zener diode 58, its emitter connected to the cathode of the thyristor 48 and its base connected through resistor 53 to a signal transmitting terminal 59 which is adapted to mate with a corresponding terminal of the camera. A resistor 52 is connected between the gate of the thyristor 48 and bus 5. The illumination control circuit operates in response to the application of a negative pulse from the signal transmitting terminal 59 to the base of the transistor 57 through resistor 53. Thereupon the transistor 57 conducts to allow the capacitor 56, which has been charged to the polarity shown and to a value determined by the Zener diode 58 during the time the discharge tube 22 emits light, to discharge through a path including resistor 52, the gate to cathode path of the thyristor 48, the emitter to collector path of the transistor 57 and returning to capacitor 55, thus rendering the thyristor 48 conductive to operate the commutation circuit.

Figure 4:
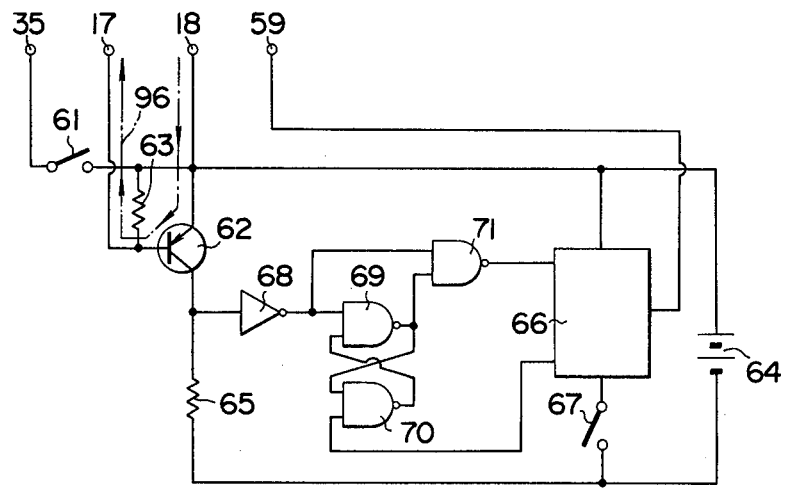
FIG. 4 is a schematic diagram of part of the testing apparatus shown in FIG. 3 which is located within the camera.

The testing apparatus also includes an electrical circuit within the camera, as shown in FIG. 4, for cooperation with the automatic electronic flash described above. In this Figure, a synchro contact 61 is connected across signal transmitting terminals 35, 18. A trigger switch which is synchronized with the light emission signal is formed by a PNP transistor 62 having its base connected to the signal transmitting terminal 17, and having its emitter connected to the terminal 18. Resistor 63 is connected across the emitter and base of the transistor 62. The camera internally houses a power supply in the form of a battery 64, the positive terminal of which is connected to the emitter of the transistor 62 which has its collector connected through resistor 65 to the negative terminal of the battery. The camera also houses an exposure control circuit 66 which is connected across the battery 64 in series with a power switch 67 which is adapted to be closed as a movable mirror moves up. In this manner, the exposure control circuit 66 is fed from the battery whenever the mirror assumes its up position. The light emission signal which is produced as the flash discharge tube 22 begins its emission of light is detected by the transistor 62, and is fed from the collector thereof to the exposure control circuit 66 through a logic circuit. Specifically, the collector of the transistor 62 is connected through an inverter 68 to one input of NAND gate 69, and the exposure control circuit 66 has a reset terminal which is connected to one input of NAND gate 70. The other input of NAND gates 69, 70 is connected to the output of the other gate, thus forming together a flipflop. The one input and the output of NAND gate 69 are connected to two inputs of NAND gate 71, the output of which is connected to an input of the exposure control circuit 66. The output of the exposure control circuit 66 is connected to a signal transmitting terminal 59 which is utilized for the purpose of TTL illumination control.

Figure 5:
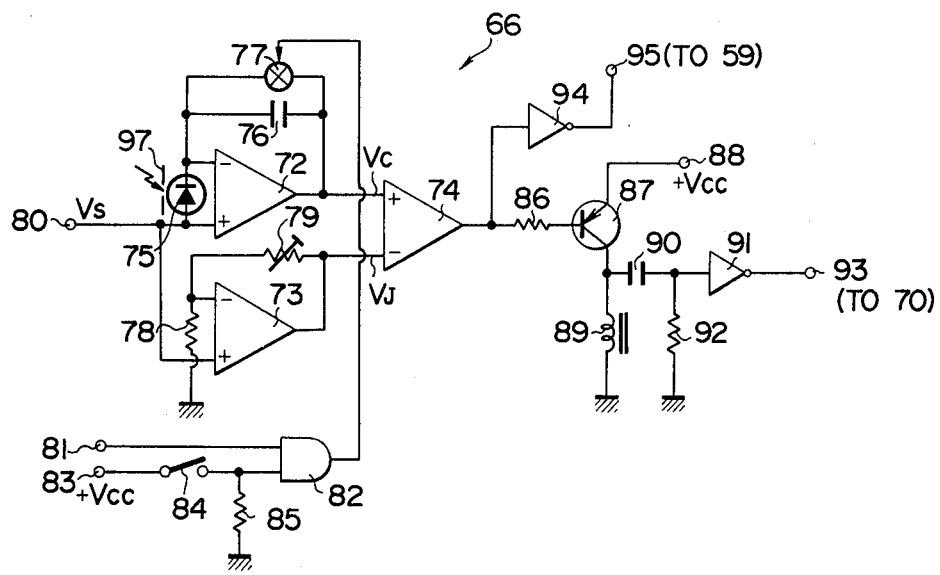
FIG. 5 is a circuit diagram of an exposure control circuit shown in FIG. 4.

The exposure control circuit 66 is constructed as shown in detail in FIG. 5. In this Figure, the exposure control circuit 66 includes a photometric circuit which comprises operational amplifiers 72, 73, 74, photometric element 75, integrating capacitor 76, triggering analog switch 77, resistor 78 and semi-fixed resistor 79. Specifically, the photometric element 75 is formed by a photoelectric transducer element such as a silicon photodiode, and receivers reflected light from a first shutter blind surface and a film surface to produce a photocurrent or an electrical signal which is proportional to the intensity of the reflected light. It is connected across the non-inverting and the inverting input terminal of the operational amplifier 72. The purpose of the capacitor 76 is to integrate the photocurrent from the photometric element 75 by being charged by the current, and is connected across the inverting input terminal and the output terminal of the operational amplifier 72. The analog switch 77 is connected in shunt with the capacitor 76 and is normally closed to short-circuit the capacitor. The analog switch 77 is opened in interlocked relationship with a shutter release operation or in response to the light emission signal to allow an integrating operation by the operational amplifier 72. A terminal 80 which is supplied with a reference voltage Vs is connected to the non-inverting input terminal of the operational amplifier 72.

The combination of the operational amplifier 73, semi-fixed resistor 79 and resistor 78 constitute together a circuit which produces a comparison voltage $V_j$ against which an output voltage Vc from the operational amplifier 72 is compared. The semi-fixed resistor 79 allows the value of the comparison voltage Vj to be preset in accordance with a film speed, and is connected across the inverting input terminal and the output terminal of the operational amplifier 73. The resistor 78 is connected between the inverting input terminal of the operational amplifier 73 and the ground while the non-inverting input terminal of the operational amplifier 73 is connected to the terminal 80.

The operational amplifier 74 functions as a comparator which compares the output voltage Vc from the operational amplifier 72 applied to its non-inverting input terminal against the comparison voltage Vj applied to its inverting input terminal. When the output voltage Vc is less than the comparison voltage Vj, the operational amplifier 74 produces an output voltage of a negative or low level "L" while when the output voltage Vc exceeds the comparison voltage Vj, it produces an output voltage of positive or high level "H".

The exposure control circuit 66 includes an input terminal 81 to which the light emission signal from NAND gate 71 (see FIG. 4) is applied. The terminal 81 is connected to one input of AND gate 82, the other input of which is connected to a terminal 83, to which a voltage +Vcc from the battery 64 is applied, through a trigger switch 84 which is interlocked with the running of the first shutter blind. The trigger switch 84 is closed as the shutter is wound up, and is opened by the time the film surface becomes exposed in response to a shutter release operation to allow a running of the first blind. A resistor 85 is connected to the other input of AND gate 82 to maintain "L" level at this input terminal when the trigger switch 84 is opened. The output terminal of AND gate 82 is connected to a control terminal of the analog switch 77 in the photometric circuit so as to open or close the switch in accordance with an output from AND gate 82. Specifically, when "H" level signals are applied to both input terminals of AND gate 82, it produces an "H" level output to close the analog switch 77. When either input to AND gate is at "L" level, it produces an "L" level output to open the analog switch 77.

The output terminal of the operational amplifier 74 is connected through resistor 86 to the base of a PNP transistor 87, which functions to control the operation of the second shutter blind. The transistor 87 has its emitter connected to a terminal 88 which receives the supply voltage +Vcc and its collector connected to the ground through a second blind controlling electromagnet 89. The collector of the transistor 87 is also connected through capacitor 90 to the input of an inverter 91, which input is also connected to the ground through resistor 92. The output of the inverter 91 is connected to a reset terminal 93 which is connected to one input of AND gate 70 (see FIG. 4). The combination of capacitor 90 and resistor 92 forms a differentiator, so that when the transistor 87 conducts, the rising edge of the collector potential causes a positive differentiated pulse to be produced, which is inverted by the inverter 91 to provide a reset pulse at the terminal 93.

The output terminal of the operational amplifier 74 is also connected to the input of an inverter 94, the output terminal of which is connected to an output terminal 95 which is in turn connected to the signal transmitting terminal 99 which is utilized for purpose of TTL illumination control.

The operation of the testing apparatus will now be described with reference to a series of timing diagrams shown in FIG. 6. Initially when the movable mirror moves upward, the power switch 67 in FIG. 4 is closed in interlocked relationship therewith, thereby activating the exposure control circuit 66 which is then fed with the voltage +Vcc from the battery 64. Since the transistor 62 remains non-conductive, its collector potential is at "L" level, and hence the inverter 68 feeds "H" level to NAND gate 71. Under this condition, the output of the flipflop or the output of NAND gate 69 is at "L" level, whereby the output of NAND gate 71 is at "H" level. This "H" level output from NAND gate 71 is fed from the input terminal 81 of the exposure control circuit 66 shown in FIG. 5 to one input of AND gate 82. If the first shutter blind has been wound up and the shutter is charged, the trigger switch 84 which is interlocked with the running of the first blind is closed, and hence the closure of the power switch 67 allows the voltage +Vcc to be applied to the other input of AND gate 82, which therefore outputs an "H" level signal applied to the analog switch 77. With the "H" level signal applied to the control terminal of the analog switch 77 from AND gate 82, the switch remains closed, preventing an accumulation of charge on the capacitor 76. Hence, the operational amplifier 72 produces no integrated output if the photometric element 75 receives reflected light from the first shutter blind, the operational amplifier 74 then producing an "L" level output. This renders the transistor 87 conductive, whereby the electromagnet 89 is energized and becomes effective to constrain the second shutter blind from running. Simultaneously the capacitor 90 is charged, and the terminal 93 assumes "H" level after an "L" level reset pulse is detected thereat for a given time interval t which is approximately equal to the product $C_{90} \cdot R_{92}$ where $C_{90}$ represents the capacitance of capacitor 90 and $R_{92}$ the resistance of resistor 92. The "L" level output from the operational amplifier 74 is inverted by the inverter 94 before it is applied to the output terminal 95.

When the power switch 2 of the electronic flash is now closed, the booster 3 feeds the buses 4, 5, whereby the main capacitor 6 begins to be charged. In addition, the buses 7, 5 are also fed to charge the capacitor 9. It will be understood that the voltage across buses 5, 7 is determined by the breakdown voltage of Zener diode 8. Representing this voltage by Vz1, there occurs a current flow of a magnitude $Vz1/R_{13}$ through a path 96 shown in phantom line and joining the terminals 17, 18 between the electronic flash and the camera. Here $R_{13}$ represents the resistance of resistor 13. The current flow through the emitter-base path of the transistor 62 connected across the terminals 17, 18 renders it conductive, whereby its collector potential changes from "L" to "H" level. Accordingly, one input of NAND gate 71 fed from the inverter 68 changes to "L" level. Since this input is supplied to NAND gate 71 together with the output from NAND gate 69 which assumes "H" level, the output of NAND gate 71 or a signal level applied to the input terminal 81 of the exposure control circuit 66 is maintained at "H" level. A change of the output of NAND gate 69 to "H" level changes the output from NAND gate 70 to "L" level.

When the completion of charging the main capacitor 6 is indicated by the illumination of the neon tube 21, a test illumination can be performed by closing the test switch 34. The closure of the test switch 34 causes the trigger circuit to fire the thyristor 30 by utilizing a discharge current of the capacitor 27. Thereupon the capacitor 28 discharges, inducing a high tension trigger pulse across the secondary coil of the trigger transformer 32 which is applied to the trigger electrode 33 of the flash discharge tube 22. Simultaneously, the capacitor 38 discharges to fire the thyristor 36, whereby the main capacitor 6 discharges through a path including the discharge tube 22, the thyristor 36 and diode 37, causing an emission of flashlight from the discharge tube 22. The resulting reflected light impinges upon the photometric element 75 which is provided on the part of the camera.

During the time the main capacitor 6 is being charged, the capacitor 14 in the detector 10 is charged to the polarity shown, and as the discharge tube 22 emits flashlight, the capacitor 14 discharges through a path including resistor 11, discharge tube 22, thyristor 36, diode 37, the emitter-base path of transistor 16, resistor 12 and returning to the capacitor 14 or through an alternative path including resistor 11, resistor 26, thyristor 30, diode 31, the emitter-base path of transistor 16, resistor 12 and returning to capacitor 14, thus rendering transistor 16 conductive. The conduction of the transistor 16 short-circuits the path across the terminals 17, 18, whereby current flow across the emitter-base of the transistor 62 is interrupted, thus rendering it non-conductive to change the collector potential thereof to "L" level. One input of NAND gate 71 which is fed from the inverter 68 then changes to "H" level, but because the other input to NAND gate 71 which is fed from the flipflop remains at "H" level, the output of NAND gate 71 changes to "L" level, which represents a light emission signal applied to the input terminal 81 of the exposure control circuit 66.

Upon application of the light emission signal of "L" level to the input terminal 81, the output of AND gate 82 changes to "L" level, opening the analog switch 77. As a result, the capacitor 76 is allowed to charge, and the operational amplifier 72 provides an integrated voltage Vc in accordance with the amount of light received by the photometric element 75. It should be understood that the diaphragm 97 is set at an actual value at this time, and the photometric element 75 receives a corresponding amount of light. As the output voltage Vc from the operational amplifier 72 gradually increases to exceed the comparison voltage Vj determined by the operational amplifier 73, the output of the operational amplifier 74 changes to "H" level. Thereupon, the transistor 87 is rendered non-conductive, deenergizing the electromagnet 89. Simultaneously, the "H" output from the operational amplifier 74 is inverted by the inverter 94 to provide "L" signal which is developed at the output terminal 95 as TTL illumination control signal.

When the illumination control signal appears at the output terminal 95, it is applied to the transistor 57 in the illumination control circuit through the terminal 59, thus turning it on. Consequently, the capacitor 55 which has been charged to the polarity shown as the tube 22 discharges, turns the commutating thyristor 48 conductive. The conduction of the thyristor 48 causes the voltage across the capacitor 50 which has been charged to the polarity shown to be applied across the series combination of the thyristor 36 and diode 37 with a reverse polarity, thus rendering the thyristor 36 non-conductive. This permits the capacitor 42 in the illumination completion indicator to be charged, and when the capacitor 42 is completely charged, the discharge tube 22 ceases to emit light. The fact that the illumination control circuit has rendered the thyristor 36 non-conductive is indicated by a flashing operation of the neon tube 44.

It will thus be seen that a series of operations beginning with the initiation of emission of flashlight from the flash discharge tube 22 and ending with the interruption of emission of flashlight by the operation of the illumination control circuit in response to the illumination control signal from the exposure control circuit 66 is entirely automatically performed in response to a mere closure of the test switch 34 without involving a shutter operation.

After the discharge tube 22 has ceased to emit light, when the discharge of the capacitor 14 renders the transistor 16 non-conductive, there again occurs a current flow through a path 96 extending through the terminals 17, 18 to render the transistor 62 conductive, whereby its collector potential assumes "H" level. The output of NAND gate 71 which is applied to the input terminal 81 of the exposure control circuit 66 then changes to "H" level, whereby the analog switch 77 is closed to inhibit an integrating function by the operational amplifier 72. Thus, the output of the operational amplifier 74 changes to "L" level, and signal at the output terminal 95 changes to "H" level to interrupt the illumination control signal. The transistor 87 is rendered conductive to energize the electromagnet 89, and an "L" reset pulse is produced at the reset terminal 93. When applied to NAND gate 70 of the flipflop, the reset pulse resets it.

During normal flash photography, the trigger switch 84 which is interlocked with the running of the first blind is already closed during the time the shutter blind is being wound up. When the shutter is released, the switch is opened as the first blind begins to run by the time the film surface becomes exposed. Thus AND gate 82 applies "L" level signal to the control terminal of the analog switch 77 to open it, allowing the operation of the integrating circuit formed by the capacitor 76 and the operational amplifier 72. At the time the first blind has completed running and the full film surface is exposed, the synchro contact 61 is closed to initiate the emission of flashlight from the discharge tube 22. The resulting reflected light from an object being photographed impinges upon the photometric element 75, and when the integrated voltage Vc from the operational amplifier 72 exceeds the comparison voltage Vj supplied from the operational amplifier 73, the operational amplifier 74 produces an "H" output. This provides an illumination control signal which is applied to the illumination control circuit from the output terminal 95 of the exposure control circuit 66, interrupting the emission of flashlight from the discharge tube 22. Also, the electromagnet 89 is deenergized to allow the running of the second blind, thus terminating a flash photography.

In the manner mentioned above, the exposure control circuit 66 functions properly either during a test illumination or during a normal flash photography, and an integrating operation by the photometric circuit takes place according to an independent timing.

What is claimed is:

1. In a combination of a single lens reflex camera of the TTL direct photometry type and a TTL automatic electronic flash, in which the camera includes an exposure control circuit having a photometric element on which light passing through a taking lens and reflected from a shutter blind surface and a film surface impinges, and the electronic flash includes a flash discharge tube, the emission of light therefrom being interrupted in response to an illumination control signal which is produced by the exposure control circuit; an apparatus for testing the automatic electronic flash comprising:

a test switch in said electronic flash connected in parallel with a synchro contact switch contained within the camera for use during actual flash photography operations, said test switch for initiating the emission of flashlight upon being closed to test the emission of flashlight from the flash discharge tube without a shutter operation;

said exposure control circuit including said photometric element for receiving light during testing of said electronic flash and during actual flash photography, said photometric element operating to receive said emitted flashlight when said test switch is closed;

means for detecting the emission of flashlight from the flash discharge tube as it is activated in response to the closure of the test switch and for producing a light emission signal;

means in said camera for receiving said light emission signal and applying same to said exposure control circuit;

said exposure control circuit including a trigger switch and means for operating said trigger switch to activate said exposure control circuit in response to receiving said light emission signal from said receiving means; and said activated exposure control circuit including means for providing an integrated voltage in accordance with the amount of light received by said photometric element during said test operation.

2. An apparatus according to claim 1 in which the test switch comprises a normally open pushbutton switch which is physically disposed on the part of the electronic flash.

3. An apparatus according to claim 1 in which the detecting means comprises a capacitor which is adapted to discharge whenever the flash discharge tube emits flashlight, a first transistor connected in a discharge circuit of the capacitor and adapted to be rendered conductive in response to the discharge of the capacitor, and a second transistor providing an output level which changes as the first transistor conducts, the output level produced by the second transistor as the first transistor conducts being derived as said light emission signal.

4. An apparatus according to claim 3 in which the capacitor and the first transistor are physically disposed within the electronic flash while the second transistor is disposed on the part of the camera.

5. An apparatus according to claim 1 in which the means for operating the trigger switch is responsive to the light emission signal and a switching signal which is produced as a first shutter blind runs, both of these signals serving as inputs, and wherein the trigger switch comprises an analog switch, at least one of the inputs to the operating means controlling the opening or closing of the trigger switch.

6. An apparatus according to claim 5 in which the operating means comprises an AND gate which is provided on the part of the camera and which controls the trigger switch in response to a low level output from the AND gate whenever at least one of the light emission signal and the switching signal is at its low level.

7. An apparatus according to claim 1 wherein said electronic flash includes a main capacitor, and means for indicating the completion of charging of said main capacitor.

8. An apparatus according to claim 7 wherein said indicating means is an illumination means.

9. An apparatus according to claim 1 further including a trigger circuit for causing a first switch means to conduct, and in response thereto, a trigger transformer applies an activating signal to a trigger electrode of said flash discharge tube.

10. An apparatus according to claim 9 wherein said first switch means causes a second switch means to conduct, and in response thereto, a main capacitor discharges and causes an emission of light from said discharge tube.

11. An apparatus according to claim 1 wherein said electronic flash includes an illumination control circuit for receiving said illumination control signal from said exposure control circuit.

12. An apparatus according to claim 11 further including a circuit for indicating the completion of illumination in response to operation of said illumination control circuit.

* * * * *

UNITED STATES PATENT AND TRADEMARK OFFICE
CERTIFICATE OF CORRECTION

PATENT NO. : 4,429,971
DATED : February 7, 1984
INVENTOR(S) : Kazunori Mizokami

It is certified that error appears in the above—identified patent and that said Letters Patent is hereby corrected as shown below:

Column 2:

Line 14, change "test" to --testing--.

Column 3:

Line 57, change "resistors" to --resistor--.

Column 6:

Line 22, change "receivers" to --receives--.

Signed and Sealed this

Twentieth Day of November 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,429,971

DATED : February 7, 1984

INVENTOR(S) : Kazunori Mizokami

It is certified that error appears in the above-identified patent and that said Letters Patent is hereby corrected as shown below:

Column 3, line 11, "are", second occurrence, should read -- be --.

Signed and Sealed this

Fifteenth Day of January 1985

[SEAL]

*Attest:*

*Attesting Officer*

GERALD J. MOSSINGHOFF

*Commissioner of Patents and Trademarks*